United States Patent
Mori

(10) Patent No.: US 7,379,200 B2
(45) Date of Patent: May 27, 2008

(54) PRINTING SYSTEM, METHOD FOR CONTROLLING PRINTING SYSTEM, AND COMPUTER-READABLE MEMORY MEDIUM

(75) Inventor: Junichi Mori, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 632 days.

(21) Appl. No.: 11/104,529

(22) Filed: Apr. 13, 2005

(65) Prior Publication Data

US 2005/0189711 A1    Sep. 1, 2005

Related U.S. Application Data

(62) Division of application No. 09/383,924, filed on Aug. 26, 1999, now Pat. No. 6,903,834.

(30) Foreign Application Priority Data

Aug. 28, 1998  (JP)  ................. 10-242635

(51) Int. Cl.
*G06K 1/00* (2006.01)
*G06F 3/12* (2006.01)
*G06F 15/00* (2006.01)

(52) U.S. Cl. .................. 358/1.15; 358/1.14

(58) Field of Classification Search ............. 358/1.1, 358/1.15, 1.9, 402; 710/7–10, 19; 709/201–203
See application file for complete search history.

(56) References Cited

U.S. PATENT DOCUMENTS

| 5,435,544 | A |  | 7/1995 | Mandel | 271/298 |
| RE37,031 | E |  | 1/2001 | Nishiwaki | 358/1.14 |
| 6,348,971 | B2 |  | 2/2002 | Owa et al. | 358/1.15 |
| 6,822,754 | B1 | * | 11/2004 | Shiohara | 358/1.15 |
| 6,940,615 | B1 | * | 9/2005 | Shima | 358/1.15 |

* cited by examiner

*Primary Examiner*—Douglas Q. Tran
(74) *Attorney, Agent, or Firm*—Fitzpatrick, Cella, Harper & Scinto

(57) ABSTRACT

When a print job described in JL (job language) is transferred from a host device via a communication medium, JL is interpreted by a JL parser, encapsulated PDL (page description language) is interpreted by a PDL translator, and image data to be printed is produced, and printed in a printer engine. When printing is completed, information on the paper output place is stored in a job information table. When an inquiry in JL is made from the host, on the basis of this, the job information table is retrieved, and answer data on the corresponding paper output place is returned to the host device, and informed to a user via display processing on the host device or the like.

10 Claims, 13 Drawing Sheets

FIG. 3

PRINT DATA

| | |
|---|---|
| ⟨ESC⟩ %-12345X | (1) |
| @PJL JOB NAME="jmori_1997_12_15_11_45_37" | (2) |
| @PJL SET OUTPUT-PLACE=BIN 1 | (3) |
| @PJL ENTER LANGUAGE=LIPS | (4) |
| ··· ⟨PDL DATA⟩ ··· | (5) |
| ⟨ESC⟩ %-12345X | (6) |
| @PJL EOJ NAME="jmori_1997_12_15_11_45_37" | (7) |

FIG. 4

JL INQUIRY DATA

| | |
|---|---|
| ⟨ESC⟩ %-12345X | (1) |
| @PJL INFO OUTPUT-PLACE | (2) |
| JOB NAME="jmori_1997_12_15_11_45_37" | (3) |

FIG. 5

JL ANSWER DATA

| | |
|---|---|
| @PJL ANSWER OUTPUT-PLACE=BIN 1 | (1) |
| JOB NAME="jmori_1997_12_15_11_45_37" | (2) |

CURRENT JOB INFORMATION 160

| JOB NAME | PAPER OUTPUT PLACE |
|---|---|
| "jmori_1997_12_15_11_45_37" | BIN 1 |

JOB INFORMATION TABLE 159

| JOB NAME | PAPER OUTPUT PLACE |
|---|---|
| "jmori_1997_12_15_07_10_10" | BIN 1 |
| "jmori_1997_12_15_07_15_25" | BIN 2 |
| "jmori_1997_12_15_07_23_03" | BIN 1 |
| "jmori_1997_12_15_07_23_52" | BIN 1 |
| "takashi_1997_12_15_08_00_47" | BIN 3 |
| "kakky_1997_12_15_08_12_20" | BIN 2 |
| "kakky_1997_12_15_08_15_38" | BIN 2 |
| "toitoi_1997_12_15_08_28_51" | BIN 1 |
| "takashi_1997_12_15_10_02_33" | BIN 3 |
| ⋮ | ⋮ |

FIG. 8

JOB INFORMATION TABLE 159

| JOB NAME | PAPER OUTPUT PLACE |
|---|---|
| "jmori_1997_12_15_07_10_10" | BIN 1 |
| "jmori_1997_12_15_07_15_25" | BIN 2 |
| "jmori_1997_12_15_07_23_03" | BIN 1 |
| "jmori_1997_12_15_07_23_52" | BIN 1 |
| "takashi_1997_12_15_08_00_47" | BIN 3 |
| "kakky_1997_12_15_08_12_20" | BIN 2 |
| "kakky_1997_12_15_08_15_38" | BIN 2 |
| "toitoi_1997_12_15_08_28_51" | BIN 1 |
| "takashi_1997_12_15_10_02_33" | BIN 3 |
| "jmori_1997_12_15_11_45_37" | BIN 1 |
| ⋮ | ⋮ |

JOB INFORMATION TABLE 159

| JOB NAME | PAPER OUTPUT PLACE |
|---|---|
| "jmori_1997_12_15_07_15_25" | BIN 2 |
| "takashi_1997_12_15_08_00_47" | BIN 3 |
| "kakky_1997_12_15_08_12_20" | BIN 2 |
| "kakky_1997_12_15_08_15_38" | BIN 2 |
| "takashi_1997_12_15_10_02_33" | BIN 3 |
| | |
| ⋮ | ⋮ |
| | |

FIG. 12

JL END-OF-JOB NOTICE DATA

| @PJL JOB-FINISHED OUTPUT-PLACE=BIN 1 | (1) |
| JOB NAME="jmori_1997_12_15_11_45_37" | (2) |

FIG. 13

JL PAPER REMOVAL NOTICE DATA

| @PJL PAPER-REMOVED OUTPUT-PLACE=BIN 1 | (1) |

FIG. 17

LIST OF PRINTERS

| PRINTER ADDRESS | PRINTER NAME |
|---|---|
| 150. 61. 66. 66 | "LBP2023 (2F)" |
| 150. 61. 66. 67 | "LBP750 (2F)" |
| 150. 61. 66. 68 | "LBP830 (3F)" |
| 150. 61. 66. 69 | "LBP930 (4F)" |

FIG. 18

JL ANSWER DATA

```
@PJL ANSWER OUTPUT-PLACE=UNKNOWN              (1)
JOB NAME="jmori_1997_12_15_11_45_37"          (2)
```

PRINTING SYSTEM, METHOD FOR CONTROLLING PRINTING SYSTEM, AND COMPUTER-READABLE MEMORY MEDIUM

CROSS REFERENCE TO RELATED APPLICATION

This application is a divisional of application Ser. No. 09/383,924, filed Aug. 26, 1999 now U.S. Pat. No. 6,903,834.

BACKGROUND OF THE INVENTION

1. Field of the Invention

The present invention relates to a printing system in which a host device and a printer are connected via a communication medium and a print job produced in said host device is transferred to said printer to execute printing, a method for controlling the system, and a computer-readable memory medium which stores a control program for the system.

2. Related Background Art

Heretofore, as an output device for performing output processing of a host device such as a computer or a facsimile device, there has been a printer having a plurality of paper output places such as finishers and mailboxes. Also, there is a printer having a paper output place capable of stacking 500 sheets or more.

In case of a printer having a plurality of paper output places, a user (or an application of the host device) can specifically designate which paper output place he or she likes to output to. Also, if he or she does not particularly specifically designate, the host device side or printer side automatically outputs to any paper output place. Also, even in case that he or she specifically designate a paper output place, if the paper output place is filled with output papers, there is also a printer that automatically outputs to another paper output place.

There is a printer that is provided with an output paper stack quantity detection sensor at each paper output place, and there is also a case of being able to recognize whether or not papers output to the paper output place remains. In that case, if a user removes the papers placed on the paper output place, it can be recognized by the above output paper stack quantity detection sensor.

Also, there are many cases that a plurality of host computers uses a printer in common in a network environment. In that case, it is not unusual that they use a plurality of printers in common.

As the above, the paper output system itself of the printer has become complex differently from old one having a single paper output place. Also, if, in addition to that there are pluralities of hosts and printers in an environment, it is designed such as to perform some automatic control on outputting papers, there is the possibility that a user can not find which printer of a plurality of printers the output result which he or she has surely output, or even in case that he or she knows which printer, he or she forgot or can not find which paper output place it has been output to. In that case, there is the problem that hunting up the aimed printed result requires the more labor the more the system becomes complex.

Also, in view of the above problem, since printers can at least recognize the paper output place of the output destination of each print job, it may be possible to store this information in a memory, and inform the paper output destination in response to a user's inquiry or the like. However, for example, if information on all output jobs is maintained for any length of time, it requires infinite memory for maintaining. This is quite not a realistic method.

SUMMARY OF THE INVENTION

The first aspect of the present invention is to solve the above problem and provide a printing system in which a user of a host device can clearly know;
at which paper output place and
in which printer
the printed results that the user will output (or has output) are output (or has output).

Accordingly, the second aspect of the present invention to provide a printing system in which the memory resources are not wasted wastefully, information on paper output destination of a job is managed suitably, a host device or a user of it can be notified in case of need, the information on paper output destination on a job or information on the whole of jobs can be suitably eliminated when it becomes useless, and thereby a realistic job management can be performed.

For solving the above aspects, in the present invention, in a printing system in which a host device and a printer are connected via a communication medium and a print job produced in said host device is transferred to said printer to execute printing, a method for controlling the system, and a computer-readable memory medium which stores a control program for the system, the construction is employed that:

paper output place information on the paper output place used in said print job is registered in memory means when the print job is completed;

paper output place information on a designated print job is retrieved from said memory means in accordance with a request from said host device; and the paper output place information on the designated print job obtained by said retrieval is informed to a user of said host device.

Also, in the present invention, the construction is employed that the paper output place information of the print job having used the corresponding paper output place is eliminated from said memory means when papers are removed from the paper output place of said printer.

Also, in the present invention, the construction is employed that said registration or said retrieval is executed in said printer, or said registration or said retrieval is executed in said host device.

BRIEF DESCRIPTION OF THE DRAWINGS

FIG. 3 is an explanation view showing an example of print data described in JL (job control language);

FIG. 4 is an explanation view showing an example of JL inquiry data transmitted from a host to a printer;

FIG. 5 is an explanation view showing an example of answer data transmitted from the printer to the host;

FIG. 8 is an explanation view showing an example of the contents of a job information table;

FIG. 12 is an explanation view showing an example of print data described in JL (job control language) in the second embodiment;

FIG. 13 is an explanation view showing an example of JL information data transmitted from a printer when papers are removed from a paper output place in the second embodiment;

FIG. 17 is an explanation view showing a list of printers used in the third embodiment; and FIG. 18 is an explanation view showing an example of JL inquiry data transmitted from a host to a printer in the third embodiment.

DETAILED DESCRIPTION OF THE PREFERRED EMBODIMENTS

Figure 1:
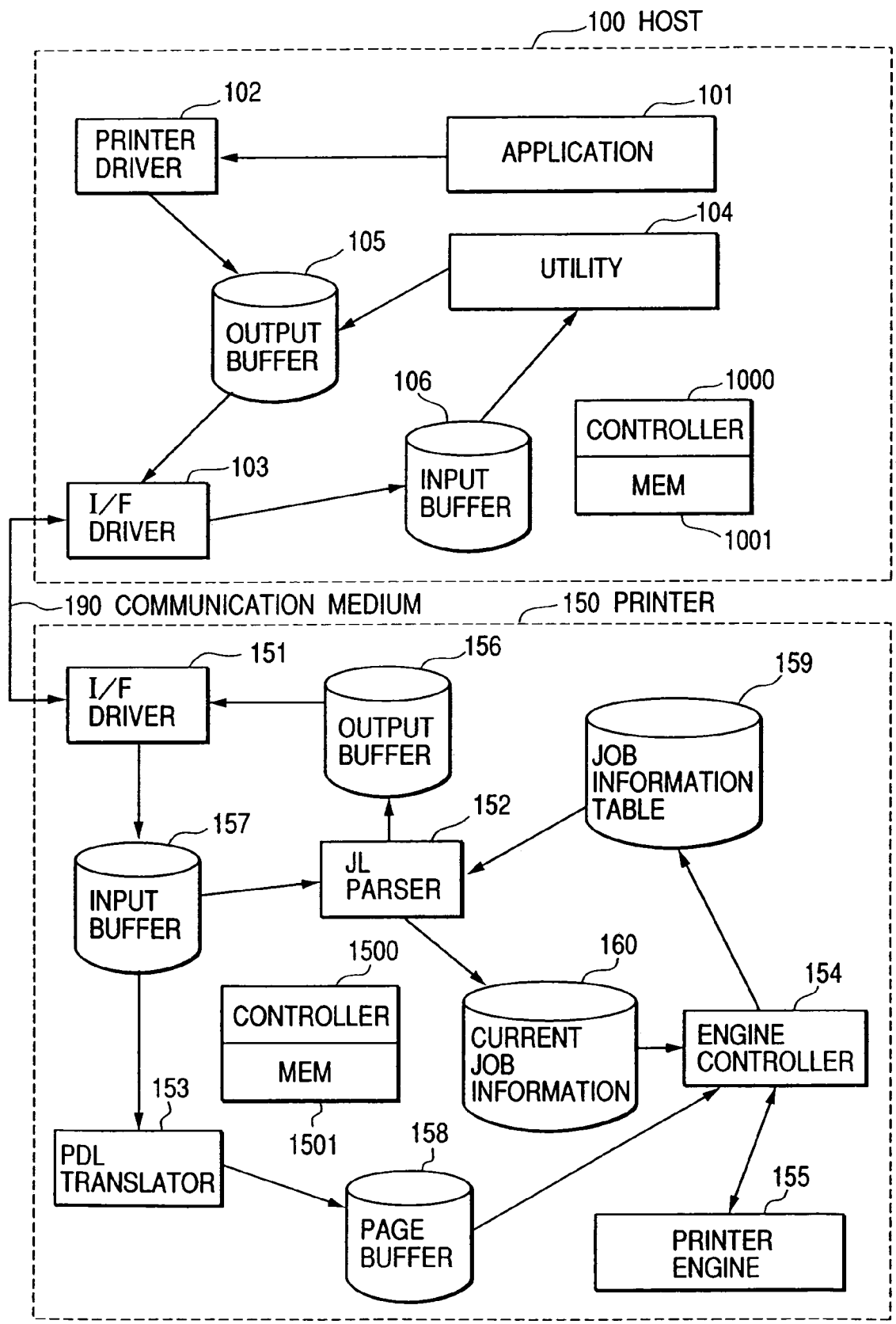
FIG. 1 is a block diagram explaining the construction of a printing system in the first embodiment of the present invention.

Hereinafter, The present invention will be described in detail on the basis of the embodiments shown in the drawings.

First Embodiment

FIG. 1 is a block diagram showing the construction of a printing system in the first embodiment of the present invention. The printing system of this embodiment has the construction in which a host computer (hereinafter host) 100 and a printer 150 are connected via a predetermined communication medium 190.

Here, the host 100 comprises an application 101, a printer driver 102, an I/F (interface) driver 103, a utility 104, an output buffer 105, and an input buffer 106. Also, it comprises a not-shown keyboard, a not-shown mouse, a not-shown display, etc.

An operating system is working in the host 100. The application 101 that operates thereon provides a graphic user interface to a user, and produces image data suitable for the user's purpose. The application 101 is for executing document-processing, image-editing, transmission and reception of various data, etc. Image data is produced upon that from data in a format of character, image and others, in accordance with the purpose of an application.

The printer driver 102 is incorporated in part of the operating system or the like as part of library, kernel or the like. It is for converting image data produced by the application 101 into data in page description language (hereinafter PDL) printable in the printer 150.

The I/F driver 103 is for making communication in two ways with the printer 150 on print data and control data. It transmits data stored in the output buffer 105 to the printer 150. Further, the I/F driver 103 receives data transmitted from the printer 150 and stores it in the input buffer 106. The utility 104 provides a graphic user interface to a user. Via the graphic user interface, it gives information obtained from the printer 150 to the user, or changes the setting of the environment of the printer 150 in accordance with the user's demand.

Besides, the communication medium 190 comprises IEEE 1284 (a parallel interface called Centronics system or the like from old times), a serial interface such as RS232C, a LAN such as Ethernet, or the like. The I/F driver 103 and an I/F driver 151 of the printer 150 described later that meet the construction of this communication medium 190 are used.

The output buffer 105 of the host 100 is for temporarily storing print data produced by the printer driver 102, and control data such as an inquiry in job language (hereinafter referred to as JL in short) produced by the utility 104. The specification of JL will be described later in detail.

On the other hand, the input buffer 106 is for temporarily storing data received by the I/F driver 103 from the printer 150. In the present invention, it is used for storing data received from another host or the like, as well as data obtained from the printer 150 through the control of the above JL.

Among the above, the application 101, utility 104, or part of the printer driver 102 or I/F driver 103 is implemented by software of a controller 1000 comprising a CPU, etc., of the host computer. The controller 1000 includes a memory 1001 comprising a ROM, a RAM, or an external storing device such as a hard disc. The above software is stored in this memory 1001 and executed thereon. The above output and input buffers 105 and 106 are physically assigned to proper regions in the memory 1001.

On the other hand, the printer 150 comprises an I/F driver 151 constructed in the same specification as that on the host side, a JL parser 152 for interpreting and executing JL, a PDL translator 153 for interpreting and executing PDL, an engine controller 154 for controlling a printer engine, the printer engine 155, an output buffer 156 and an input buffer 157 for transmitting and receiving data between it and the host, and a page buffer 158 used in producing image data deliverable to the printer engine 155.

Also, the printer 150 comprises a job information table 159 storing job information for managing print jobs requested from the host, and current job information 160.

Each of the above buffers, table and job information means a storage region assigned on memory means of an external storage device such as a semiconductor memory device or a hard disc, or the data itself.

The I/F driver 151 of the above printer 150 makes communication with the host 100 on print data and control data. That is, it receives print data and control data transmitted from the host 100, and transmits data stored in the output buffer 156 to the host 100.

The JL parser 152 interprets received data and executes processing in relation to the command of JL.

The PDL translator 153 interprets the portion of PDL data among print data and converts it into image data (described in a bit map format or the like). The image data converted here is stored in the page buffer 158.

The input buffer 157 temporarily stores all data received by the I/F driver 151 and functions as a buffer for the succeeding processing. Also, the output buffer 156 is for temporarily storing data produced by the JL parser 152.

The engine controller 154 delivers image data stored in the page buffer 158 to the printer engine 155 with viewing the timing of communication with the host and printing of the printer engine 155. Also, in this embodiment, the engine controller 154 designates a paper output place to which a printed result is to be output, to the printer engine 155 with reference to current job information 160.

The printer engine 155 receives image data from the engine controller 154, and performs printing on a medium such as a paper by a known printing method (such as an electrophotographic method or an ink jet method). Further, it outputs the above medium into the paper output place designated from the engine controller 154. The construction of this printer engine 155 will be described later in more detail using FIG. 2.

As current job information 160, job information on the job that the printer engine 155 is printing is temporarily stored.

As the job information table 159, a plurality of pieces of job information on the jobs that the printer engine 155 had already printed is stored.

Among the above, part of the JL parser 152, PDL translator 153, engine controller 154, I/F driver 151, or the like, is implemented by software of a controller 1500 comprising a CPU, etc., of the printer 150. The controller 1500 includes a memory 1501 comprising a ROM, a RAM, or an external storing device such as a hard disc. The above software is stored in this memory 1501 and executed thereon. Also, the above output and input buffers 156 and 157, the regions 159 and 160 for storing job information, or the page buffer 158 is assigned to a proper region in the memory 1501.

Next, the construction of the printer engine 155 in FIG. 1 will be described using FIG. 2. Here, a printer engine of an electrophotographic method is exemplified. However, the printing method itself can be a method other than the electrophotographic method, not limiting the present invention.

Figure 2:
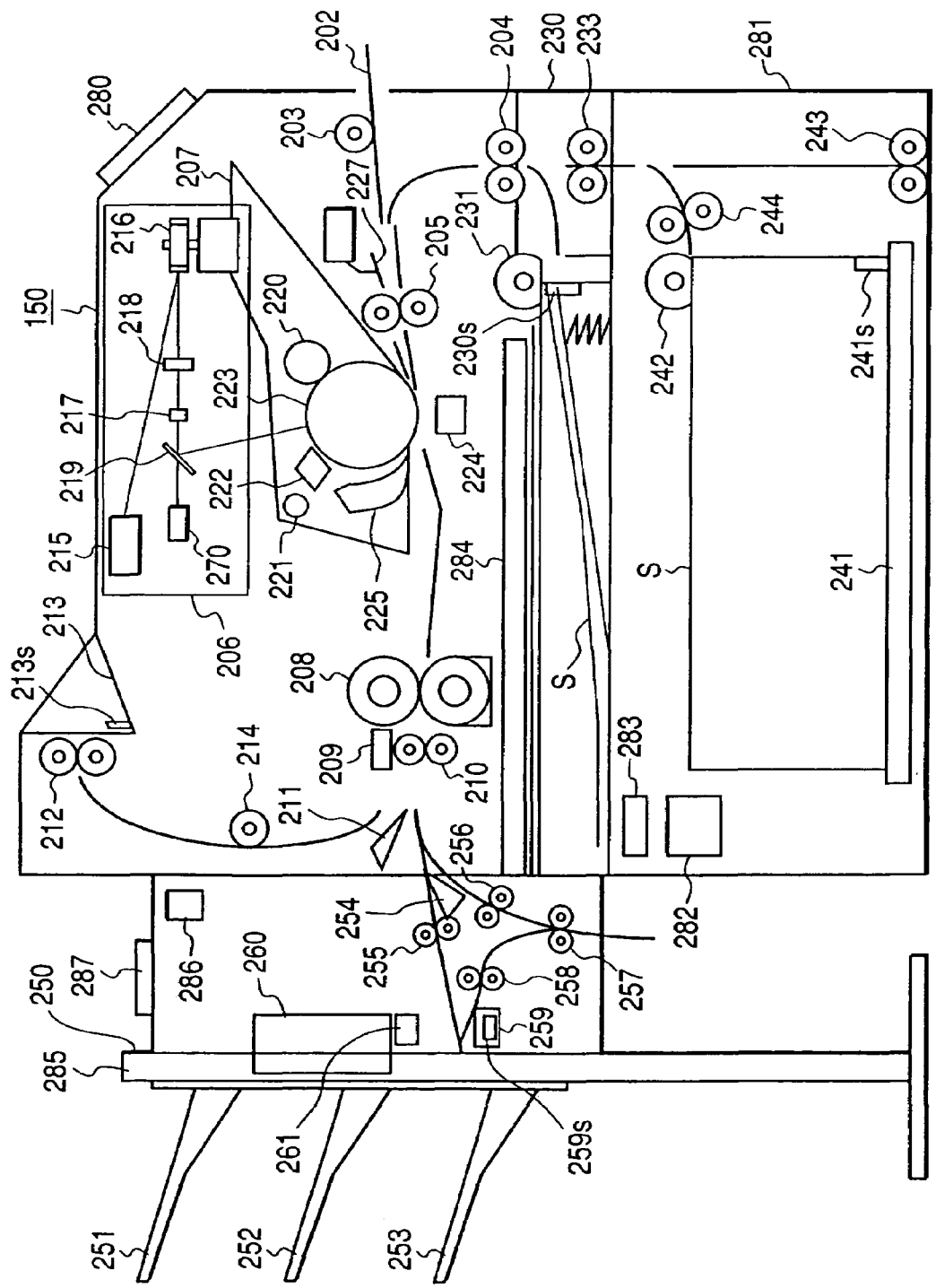
FIG. 2 is a sectional view explaining the printer engine of FIG. 1.

FIG. 2 is a sectional view explaining the construction of the printer engine 155, in which the same reference is given to the same one as that in FIG. 1.

In the drawing, reference 280 denotes a control panel comprising a display unit such as a liquid crystal panel display for displaying information on a state of the printer 100 or the like as character strings (or figures or the like), various operation buttons for a user performing various operations to the printer 100, LEDs for informing the user of the paper input place, paper output place, on-line/off-line, or the like, etc.

Reference 230 denotes a paper cassette holding recording papers S and having a system for electrically detecting the size of the recording papers S with a sensor or the like for detecting the position or the like of a not-shown partition.

Reference 231 denotes a cassette feed clutch that is a cam separating only the uppermost one of the recording papers S placed on the paper cassette 230, and conveying the separated recording paper S to feed rollers 204 by not-shown driving means. It rotates intermittently every time a paper is fed, so that one recording paper is fed by one rotation of it. Reference 230s denotes a recording paper detection sensor detecting a quantity (remaining quantity) of the recording papers S held on the paper cassette 230.

A resist shutter 227 is provided at the entrance of an image recording section 207 disposed in the central portion of the device. This resist shutter 227 is for pressing a paper to stop paper-feeding.

The printer 150 of this embodiment can feed papers from three directions of the paper cassette 230, a paper deck option unit (the lower portion of the device) 281 described later, and a manual feed tray 202.

The feed rollers 204 are for conveying the leading edge of a recording paper S taken out the paper cassette 230 to the resist shutter 227.

Also, the manual feed tray 202 is used for taking a manually fed recording paper S in. And, a manual feed clutch 203 operates to convey the recording paper S placed on the manual feed tray 202 to the resist shutter 227.

Reference 233 denotes option feed rollers (feed relay conveying rollers) for supplying a recording paper S fed from the paper feed (paper deck) option unit 281 into the main body of the printer 150.

A resist roller pair 205 for synchronously conveying a recording paper S is provided downstream of the above manual feed roller 203, cassette feed clutch 231, and option feed rollers 233 for feeding papers from the above three directions. The image recording section 207 is provided downstream of the resist rollers.

This image recording section 207 forms a toner image on a recording paper S by a known electrophotographic process with a laser beam emitted from a laser scanner 206.

A laser unit 215 of the laser scanner 206 generates a laser beam on the basis of video signal (VDO signal) sent out from a video controller (not shown) in a control unit 284. The laser beam emitted from this laser unit 215 is scanned by a polygon mirror 216 to form a latent image on a photosensitive drum 220 via a group of focussing lenses 218 and a reflecting mirror 219. A beam detector 217 of the laser scanner 206 detects a laser beam emitted from the laser unit 215 to output main scanning synchronization signal. A luminous sensor 270 detects a light quantity of the laser beam emitted from the laser unit 215.

On the other hand, a primary electrifier 222 of the image recording section 207 evenly charges on the photosensitive drum 220. A developer 223 is charged by the primary electrifier 222 and exposed to a laser beam by the laser scanner 206 to develop with toner a latent image formed on the photosensitive drum 220.

Reference 224 denotes a transcription electrifier, transcripting a toner image on the photosensitive drum 220 developed by the developer 223, onto a recording paper S fed by the resist rollers 205. A cleaner 225 is for removing toner remaining on the photosensitive drum 220. A pre-exposure lamp 221 is for discharging the photosensitive drum 220 with lights.

Reference 208 denotes a fixer for fixing a toner image formed on a recording paper S by the image recording section 207, to the recording paper S. Conveying rollers 210 conveys the fixed recording paper S to output it out of the device.

A paper output sensor 209 provided at the position of the conveying rollers 210 is for detecting a state of outputting a recording paper S.

The printer 150 of this embodiment can perform paper-outputting to a paper output option unit 285 described later or a paper output tray 213 in the upper portion of the device.

Reference 211 denotes a flapper for switching over this paper output direction. It switches over the conveying direction of a recorded recording paper S to the paper output tray 213 side or paper output option unit 285 side. References 214 and 212 denote paper output rollers outputting a recording paper S conveyed by the switchover of the flapper 211 to a stack tray 213. Reference 213s denotes a paper output stack quantity detection sensor detecting a stack quantity of recording papers stacked on the stack tray 213.

Reference 284 denotes a control unit mounted on a circuit board or the like. By an engine controller (not shown) in this control unit 284, the control of the above electrophotographic process by the laser scanner 206, image recording section 207 and fixer 208, and the control of the conveyance of a recording paper S within the main body of the printer 150.

Further, a video controller (not shown) in the control unit 284 is connected to the host 100 such as a personal computer via a general interface (e.g., Centronics, RS232C, or the like, corresponding to the above communication medium 190). It develops image information sent via the general interface into bit map data, and sends the bit map data to an engine controller (not shown) as VDO (video) signal.

Next, various option units detachably connected to the main body of the printer 150 will be described. In this embodiment, a paper deck option unit 281 is provided in the lower portion of the device, and a paper output option (finisher unit) 285 is provided as a paper output system. These option units are constructed such that, after they are bought as options of the product, they can be later-attached to the printer 150.

For this purpose, a printer 150 option controller (not shown) is provided within the main body of the printer 150 shown in FIG. 2, and can communicates in the same protocol via an option unit interface that various option units are as a common bus. Also, the option controller is connected to a video controller (not shown) via a control interface.

In the paper feed option 281 such as a paper deck option unit, reference 241 denotes a paper deck stacking recording papers S on a deck going up and down. This paper deck option unit stacks a large number of recording papers S and is mainly used for decreasing the frequency of supplying papers.

Reference 242 denotes a paper deck feed roller for taking a stacked recording paper S from the paper deck 241.

Reference 244 denotes conveying rollers conveying a recording paper S fed from the paper deck feed roller 242 in the direction of the above-mentioned option feed rollers 233.

Reference 243 denotes feed relay conveying rollers for relaying and conveying recording papers fed from other feed system option units (capable of feeding recording papers of different sizes or the same size) a plurality of which can be detachably connected to the lower portion of the paper deck option. After all, the paper deck option units 281 can be used in layers, and still another paper deck option unit 281 can be used by being added to the lower portion of the paper deck option unit 281 of FIG. 2.

Also, 241s denotes a recording paper sensor detecting a housing quantity stack quantity of recording papers S placed on the paper deck 241. Besides, the paper deck option unit 281 is controlled by a paper deck controller 282.

A paper output option unit 285 is called finisher option unit or the like, and, as three paper output places, 251 has a first delivery bin, 252 has a second delivery bin, and 253 has a third delivery bin. Recorded recording papers S are assorted and stacked on these delivery bins.

Reference 260 denotes a bin up/down motor for selecting a delivery bin to be used for paper output by moving the bins up and down. It moves the above delivery bins 251 to 253 up and down to assort recording papers S into each bin.

Reference 261 denotes a paper output stack quantity detection sensor 261 detecting a stack quantity of recording papers output to the first delivery bin 251 to third delivery bin 253 moved up and down by the bin up/down motor 260.

Reference 254 denotes a flapper performing the conveyance switchover so as to perform the face switchover of a recording paper S distributed by the flapper 211 of the main body of the printer 150 and sent to the finisher option unit 285, on the basis of instructions of a video controller (not shown), and determining the paper facing upon output.

When face-up is designated from the video controller, a recording paper S distributed to the flapper 254 is sent as it is to a paper output place by rollers 255. Also, when face-down is designated, a recording paper S distributed to the flapper 254 is once conveyed by rollers 256 and 257 till the rear edge of the recording paper S gets beyond the rollers 256, and next, the rollers 257 rotates reversely and the recording paper S is sent from its rear edge onto rollers 258 and sent to a paper output place. After all, when face-down is designated, the recording paper S is output with its printed surface facing down.

Also, reference 259 denotes a stapler. When stapling is designated, recording papers S are stored on a not-shown staple tray, the recording papers S are aligned, and the stapler 259 executes stapling and output to any of the first delivery bin 251 to third delivery bin 253.

Also, when shift is designated, like the case that stapling is designated, recording papers S are stored on the not-shown staple tray, the recording papers S are aligned, and the recording papers S are shifted together with the tray. After all, after the placed region (tray) of the recording papers S to be output is shifted, they are output to any of the first delivery bin 251 to third delivery bin 253.

Reference 259s denotes a staple needle residual quantity detection sensor for detecting a residual quantity of staple needles housed in the staple 259. Besides, the finisher option unit 285 is controlled by a finisher controller 286.

Also, the option controller (not shown), paper deck controller 282 and finisher controller 286 are respectively connected via a connector, and the control is done by making a serial communication with an option unit interface. These option units and the option controller (not shown) of the main body are connected in series (dizzy chain) to each other via the same connector. Accordingly, the paper deck option unit 281 and finisher option unit 285 can also be connected with replacing the order of connection.

Besides, downstream of the above manual feed roller 203, cassette feed clutch 231 and paper deck feed roller 242, the above resist roller pair 205, feed rollers 204 and conveying rollers 244 conveying a recording paper S are provided, respectively. Downstream of the resist roller pair 205, the image recording section 207 forming a toner image on a recording paper S by a laser beam emitted from the above laser scanner 206 is provided.

Further, downstream of the image recording section 207, the fixer 208 fixing with heat a toner image formed on a recording paper S is provided. Downstream of the fixer 208, the paper output sensor 209 detecting a state of conveyance of the paper output section, conveying rollers 210 conveying a recording paper, and flapper 211 switching over the conveyance directions of a recorded recording paper S are provided.

Now, hereinafter, operations of this printing system till the above print data is actually produced in the host 100, and transmitted to the printer 150, printing processing is executed based on it, and the printing processing is completed will be described.

At first, an example of print data produced by the application 101 and printer driver 102 of the host 100 will be described using FIG. 3.

FIG. 3 shows an example of a data list showing the structure of print data in JL (job language).

This JL is data produced from the printer driver 102 of the host computer 100 together with PDL data and transmitted to the printer 150, and has the structure in text format as shown in FIG. 3.

<ESC> in FIG. 3 indicates escape characters. Besides, in the drawing, a paragraph is inserted to indicate mnemonic, for convenience. However, a paragraph is not necessary in accordance with a specification of language.

The line of (1) is called UEL (Universal Exit Language). In this case, it indicates that the PDL translator 153 having operated till then is ended, the control is transferred to the JL parser 152, and interpreting processing of a JL command is started.

The line of (2) is a JL command indicating a job start. It indicates that a job by the name of "jmori_1997_12_15_11_45_37" starts from here. This job name can be made in a predetermined format but is constructed here from the name of a user on the host (or the host itself) and a numerical sequence made from a date. Data after this till a job end command (EOJ: the below (7)) is data of one job.

The line of (3) is a JL command designating a paper output place (mnemonic: OUTPUT-PLACE) of a paper printed by this print data. In this embodiment, as the paper output place, any of;

(a) paper output tray: TRAY (213 in FIG. 2)
(b) first delivery bin: BIN 1 (251 in the same)
(c) second delivery bin: BIN 2 (252 in the same)
(d) third delivery bin: BIN 3 (253 in the same)
(e) auto (case that any of (a) to (d) can be):

Auto can be selected. In case of the example of this FIG. 3, it is designated to output to the first delivery bin (BIN 1) as the paper output place.

The line of (4) is to instruct that processing is transferred to the PDL translator 153 by the name of "LIPS" hereinafter, and processing of interpreting PDL data and converting into image data are executed.

On the line of (5), a plurality of lines of PDL in LIPS format is actually described. In this drawing, the detail is omitted for simplicity. In practice, a description in PDL language for producing a bit map of each page printed by this job is encapsulated and transferred to the position shown by . . . <PDL data> . . . in the drawing.

The line of (6) indicates that processing of the PDL translator 153 is ended and processing is transferred to the JL parser 152 again.

The line of (7) is a JL command indicating a job end. It indicates that the job by the name of "jmori_1997_12_15_11_45_37" having started from the job start command (JOB) of the above (1) ends here.

The above is the data format of print data, i.e., print jobs produced by the application 101 and printer driver 102 of the host 100.

Next, the flow of a print job using the above JL will be described in order.

Here, when a user transmits a print request via the user interface (such as GUI or command line interface, the construction being optional) controlling the application 101 of the host 100, image data produced by the application 101 in the host 100 is sent to the printer driver 102.

The printer driver 102 converts the image data into PDL data of the printer 150 and adds necessary JL commands or the like before and behind the converted PDL data to make data as shown in FIG. 3, and stores it in the output buffer 105.

Here, the PDL data stored in the output buffer 105 and the data that necessary JL commands or the like are. added before and behind it are called "print data" hereinafter.

If it is the timing that print data can be transmitted to the printer 150 (in case that a control such as spooling is done, the data can not always be transmitted at once), the I/F driver 103 transmits the print data stored in the output buffer 105 to the printer 150.

When print data is transmitted from the I/F driver 103 of the host 100 in this manner, the I/F driver 151 of the printer 150 receives the transmitted print data and stored it in the input buffer 157.

In response to this, the JL parser 152 analyzes the print data stored in the input buffer 157 to interpret the portion of JL command. In this case, the JL parser 152 interprets each line of (1) to (4) in FIG. 3.

Figure 6:
FIG. 6 is an explanation view showing an example of the contents of current job information.

Here, to the line (3) of FIG. 3, processing is performed that a job name and a paper output place are set to current job information 160. FIG. 6 shows an example of current job information 160 when this processing is executed.

In the example of FIG. 6, "jmori_1997_12_15_11_45 37" is set as the job name and BIN 1 is set as the paper output place. Besides, information of these is shown as text information in FIG. 6, but the format of current job information 160 is optional and it is needless to say that it can be in a binary format.

And, when the JL parser 152 has completed the interpretation of portion of the JL command, it transfers the control to the PDL translator 153. By this, the PDL translator 153 interprets the PDL data of the print data stored in the input buffer 157, converts the image represented by the PDL data into image data (bit map), and stores it in the page buffer 158. The image data stored in the page buffer 158 is delivered to the printer engine 155 via the engine controller 154.

Further, it is obtained from the current job information 160 which paper output place is designated by this print job, and it is also notified to the printer engine 155. In this case, since BIN 1 is set at the paper output place of the current job information 160, it is notified that it is to output to BIN 1, that is, the first delivery bin.

Thereupon, the printer engine 155 receives the image data and performs printing on a medium such as a paper by a known printing technique, and outputs the medium to the designated paper output place. In case of FIG. 3, it is output to the first delivery bin.

Figure 7:
FIG. 7 is an explanation view showing an example of the contents of a job information table.

Further, when the printer engine 155 completes the output of all pages of the present job, it transfers the contents of the current job information 160 to the job information table 159. FIGS. 7 and 8 show an example of the construction of the job information table 159. For example, when the state of the job information table 159 before this transfer processing is as shown in FIG. 7, FIG. 8 shows the state after the transfer processing.

Besides, in FIGS. 7 and 8, the same information as the job current information 160 is stored in the job information table 159, but the job information table 159 can be used storing any other information if it is on a job.

By the above, a printed result that a user desired can be obtained, and the printed result is output to the paper output place that the user designated. Besides, information on the bin to which the job that printing and outputting have been completed was output is stored in the job information table 159.

Hereinbefore, the operations of this printing system till a print job described by print data (JL+PDL) is actually produced in the host 100, and transmitted to the printer 150, printing processing is performed based on it, and printing processing is completed have been described.

In the present invention, since information on the bin to which the job that printing and outputting have been completed was output is stored in the job information table 159, the user can be notified about the paper output destination using that information.

Hereinafter, operations of this printing system when a user issues a request for knowing where a specific job has been output will be described.

At first, when a user likes to know which paper output place of which printer this job has been output to, he or she issues a request for inquiry about paper output place to the utility 104 via a user interface (such as GUI, the construction being optional) of the application 101. For issuing the request for inquiry about this paper output place, the application 101 can be provided with a suitable user interface.

When a request for inquiry about paper output place is issued from the application 101, the utility 104 in the host 100 produces control data (JL inquiry data) as described below, and the above JL inquiry data is transmitted from the host 100 to the printer 150. FIG. 4 shows an example of this JL inquiry data.

FIG. 4 shows a data list showing the structure of the above JL inquiry data. The data of FIG. 4 is data produced from the utility 104 and has the structure in text format as shown in the drawing. <ESC> in the drawing indicates escape characters.

The line of (1) in FIG. 4 shows UEL (Universal Exit Language) like that shown in FIG. 3. It indicates that the PDL translator 153 having operated till then is ended, the control is transferred to the JL parser 152, and interpreting processing of a JL command is started.

INFO on the line of (2) is a JL command making inquiries to the printer 150. In this case, it indicates the inquiry of what is the paper output place (OUTPUT-PLACE).

The line of (3) is continued from the line of (2), and indicates which job the contents of the inquiry of (2) concerns. That is, this (2) and (3) inquire for the paper output place of the job by the job name of "jmori_1997_12_15_11_45_37".

Hereinbefore, in FIG. 4, an example of the construction of control data (called JL inquiry data) transmitted from the host 100 to the printer 150 when a user likes to know where a specific job has been output, is shown.

And, when JL inquiry data as FIG. 4 is transmitted from the host 100, in response to this, an answer is transmitted from the printer 150 to the host 100. This answer is performed by JL data as shown in FIG. 5. The data of FIG. 5 is hereinafter called JL answer data.

The data of FIG. 5 is data produced from the JL parser 152, and has the structure in text format as FIG. 5.

ANSWER on the line of (1) is a JL command indicating an answer from the printer 150 to the host 100 in response to INFO on (2) of FIG. 4. In this case, it indicates the answer that the paper output place-(OUTPUT-PLACE) is BIN 1.

The line of (2) is continued from the line of (1), and indicates which job the contents of the answer of (1) concerns. That is, this (1) and (2) answer that the paper output place of the job by the job name of "jmori_1997_12_15_11_45_37" is BIN 1, that is, the first delivery bin.

Hereinbefore, an example of the construction of control data (JL answer data) answering from the printer 150 to the host 100 in response to JL inquiry data is shown in FIG. 5.

The flow of inquiry to answer concerning paper output place using the above JL inquiry data and JL answer data is shown below.

At first, when a user likes to know which is the paper output place of this job and issues a request for inquiry about paper output place to the utility 104 via the application 101, JL inquiry data as shown in FIG. 4 produced by the utility 104 in the host 100 is stored in the output buffer 105.

In response to this, the I/F driver 103 transmits the JL inquiry data stored in the output-buffer 105 to the printer 150.

When JL inquiry data is transmitted from the I/F driver 103 of the host 100 in this manner, the I/F driver 151 of the printer 150 receives the transmitted JL inquiry data and stored it in the input buffer 157.

Thereupon, the JL parser 152 analyzes the JL inquiry data stored in the input buffer 157 to interpret the portion of the JL command. In this case, the JL parser 152 interprets all of (1) to (3) in FIG. 4 and recognizes that it is inquired about the paper output place of the job by the job name of "jmori_1997 12_15_11_45_37".

On the basis of this recognition, the JL parser 152 accesses the job information table 159. And, it retrieves the job by the job name of designated "jmori 1997_12_15_11_45_37" on the job information table 159 and obtains the paper output place corresponding to the job.

For example, if the present job information table 159 is as FIG. 8 described before, the JL parser 152 obtains that the paper output place is BIN 1. When the JL parser 152 obtains where is the paper output place in this manner, it produces JL answer data as shown in FIG. 5 and stores it in the output buffer 156. By this, the I/F driver 151 transmits the above JL answer data stored in the output buffer 156 to the host 100.

When the above JL answer data is transmitted from the I/F driver 151 of the printer 150 in this manner, the I/F driver 103 of the host 100 receives the transmitted JL answer data and stores it in the input buffer 106.

Thereupon, the utility 104 of the host 100 interprets the JL answer data stored in the input buffer 106. In this case, it interprets (1) and (2) in FIG. 5 and recognizes that it has obtained the answer that the paper output place of the job by the job name of "jmori_1997_12_15_11_45_37" is BIN 1, that is, the first delivery bin.

Figure 10:
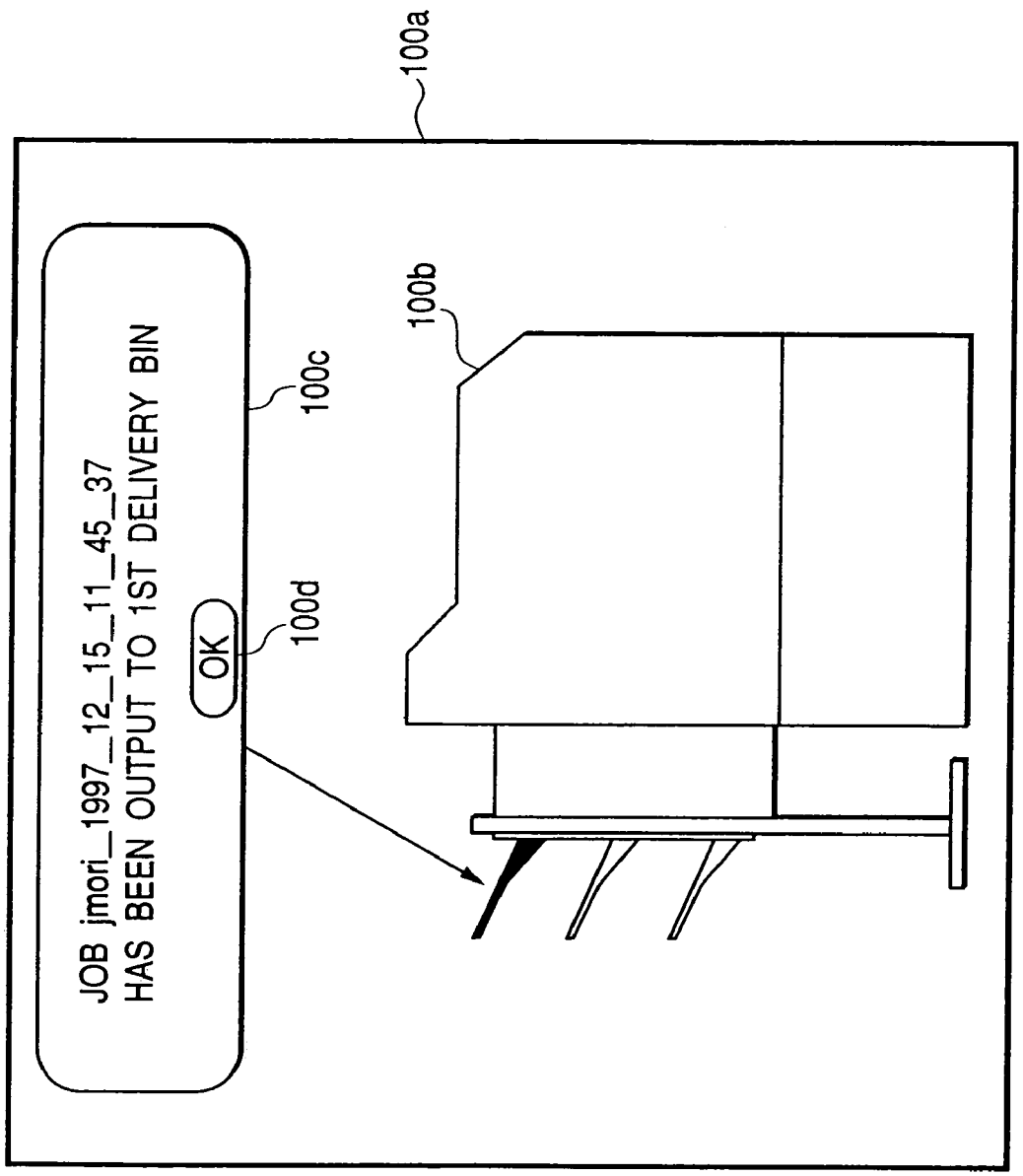
FIG. 10 is an explanation view showing an example of a display performed on the host after an inquiry about paper output destination.

And, the utility 104 displays a message window, e.g., as shown in FIG. 10 on the display (not shown) of the host 100 or the like to show the answer to the user's inquiry.

FIG. 10 shows an example of a picture 100a that the application 101 of the host 100 displays, in which a window (dialogue) 100c indicating with characters the paper output place of the inquired job on the image (or icon) 100b symbolically indicating the printer. This window (dialogue) 100c disappears by selecting the button 100d of "OK" displayed therein by a mouse or the like. Besides, the above display processing may be controlled at a lower level than the utility 104.

Hereinbefore, the operations of this printing system has been shown when a user issues a request that he or she likes to know where a specific job has been output.

In this embodiment, job control information (job control table) as FIGS. 7 and 8 is not maintained for any length of time, but job control information as FIGS. 7 and 8 is properly eliminated and renewed by performing a control as the below.

In this embodiment, when a user removes the papers having already been output to a paper output place, the corresponding information is eliminated from the job control table 159.

Hereinafter, operations of this printing system when a user removes the papers having already been output to a paper output place will be described.

As described above, the printer engine 155 is provided with a paper output stack quantity detection sensor detecting whether or not papers are stacked on each paper output place. In FIG. 2, it is detected by the paper output stack quantity detection sensor 213s whether or not papers are stacked on the paper output tray. Also, it is detected by the paper output stack quantity detection sensor 261 whether or not papers are stacked on the first delivery bin 251 to third delivery bin 253.

And, when a user removes papers from each paper output place, the above paper output stack quantity detection sensor 213s and the above paper output stack quantity detection sensor 261 recognize that papers have been removed, and inform the engine controller 154 that the papers have been removed.

For example, when the papers of the first delivery bin (BIN 1) is removed, the engine controller 154 having received the notice that the papers are removed accesses the job information table 159 to eliminate all information of jobs that the paper output place is BIN 1.

If the job information table 159 is FIG. 8, notification that papers are removed from the first delivery bin (BIN 1) is performed. In accordance with that, when the engine controller 154 eliminates all that the paper output place is BIN 1 from the job information table 159, the job information table 159 becomes as FIG. 9.

As described above, when a user removes papers that have already been output to the paper output place, job information corresponding to the paper output place from which the papers are removed is eliminated from the job information table 159 and the job information table 159 is renewed.

As described above, according to this embodiment, as for each print job, during the term since papers have been printed till the papers are removed, it is stored in the job information table of the printer which paper output place each print job has been output to. After then, when an inquiry is received from the host, the paper output place of the designated job is answered with reference to the above job information table. Further, the host informs the user of the paper output place of the above job obtained from the printer, thereby the user can know which paper output place the job that he or she output has been output to.

Also, in this embodiment, when papers are removed, information on the job that have been output to the paper output place from which the papers have been removed is eliminated from the job information table. Accordingly, the job information table can be constructed by the required minimum memory.

Besides, in this embodiment, an example in which the host and printer are connected in one-to-one by the communication medium 190 is shown. However, the connection form is optional in accordance with the construction of the communication medium 190. For example, it is needless to say that a similar construction can be implemented even if the printer 150 can be connected from a plurality of hosts via a network.

Also, between the host and printer, print data and control data can be transmitted to and received from separate channels, respectively, by using a plurality of channels in the communication medium. By such a construction, realtime performance is improved and use convenience becomes better.

Second Embodiment

In the first embodiment, the example in which the printer holds information which paper output place each job has been output to, in the job information table, and the host operates so as to make inquires to the printer when the information is necessary, is shown. However, information which paper output place the output of a job has been output to, can also be held on the host side.

Hereinafter, an embodiment in which information on paper output places of jobs is managed in the host will be described. Besides, hereinafter, as for parts overlapping with the first embodiment, the detailed description will be omitted.

Figure 11:
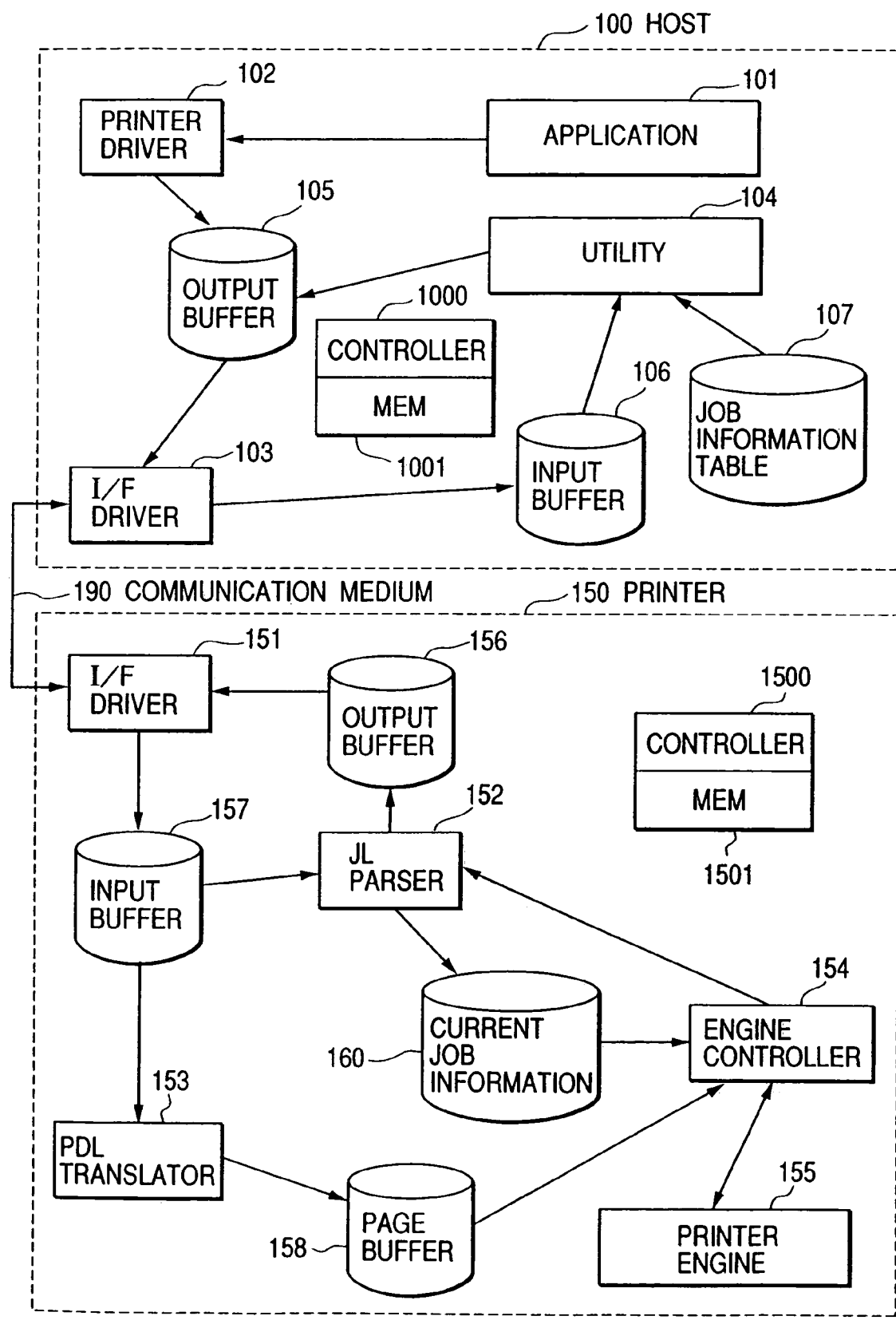
FIG. 11 is a block diagram explaining the construction of a printing system in the second embodiment of the present invention.

FIG. 11 is a block diagram showing the construction of a printing system in the second embodiment of the present invention. The same parts as those of FIG. 1 are denoted by the same references. The printing system of this embodiment has the construction in which a host 100 and a printer 150 are connected via a predetermined communication medium 190, similarly to FIG. 1.

Similarly to FIG. 1, the host 100 comprises an application 101, a printer driver 102, an I/F (interface) driver 103, a utility 104, an output buffer 105, and an input buffer 106. Also, the host 100 comprises a not-shown keyboard, a not-shown mouse, a not-shown display, etc.

Further, in case of this embodiment, in the host 100, a job information table 107 is provided.

The application 101 provides a graphic user interface to a user, and produces image data suitable for the user's purpose, similarly to the first embodiment.

The printer driver 102 converts image data produced by the application 101 into data in page description language (hereinafter PDL) printable in the printer 150.

The I/F driver 103 makes communication in two ways with the printer 150 on print data and control data. And, it transmits data stored in the output buffer 105 to the printer 150. Further, it receives data transmitted from the printer 150 and stores it in the input buffer 106.

The utility 104 provides a graphic user interface to a user. Via the graphic user interface, it gives information obtained from the printer 150 to the user, or changes the setting of the environment of the printer 150 in accordance with the user's demand.

The output buffer 105 is for temporarily storing print data produced by the printer driver 102, and control data such as an inquiry in job language produced by the utility 104. The input buffer 106 temporarily stores data received by the I/F driver 103 from the printer 150.

The job information table 107 of this embodiment is similar to the job information table 159 provided in the printer 150 in the above first embodiment, in which a plurality of pieces of information on the jobs that the printer 150 had already printed is stored.

A controller 1000 and a memory 1001 are the same as FIG. 1, so the detailed description is omitted here.

On the other hand, the printer 150 comprises an I/F driver 151, a JL parser 152, a PDL translator 153, an engine controller 154, a printer engine 155, an output buffer 156, an input buffer 157, a page buffer 158, and current job information 160. The I/F driver 151 makes communication with the host 100 on print data and control data. That is, it receives print data and control data transmitted from the host 100, and transmits data stored in the output buffer 156 to the host 100. The JL parser 152 is for interpreting received data and executing processing in relation to the command of JL.

The PDL translator 153 interprets the portion of PDL data among print data and converts it into image data. The image data (bit map) converted here is stored in the page buffer 158. The input buffer 157 temporarily stores all data received by the I/F driver 151 and functions as a buffer for the succeeding processing.

The output buffer 156 is for temporarily storing data produced by the JL parser 152.

The engine controller 154 delivers image data stored in the page buffer 158 to the printer engine 155 with viewing the timing. Further, it designates a paper output place to the printer engine 155 with reference to current job information 160.

The printer engine 155 receives image data from the engine controller 154, and performs printing on a medium such as a paper by a known printing technique. Further, it outputs the above medium into the paper output place designated from the engine controller 154. The construction of this printer engine 155 can be quite the same as FIG. 2 of the above first embodiment, so the description is omitted here.

In current job information 160 of the printer, job information on the job that the printer engine 155 is printing is temporarily stored.

Packaging of a controller 1500 and a memory 1501 is the same as FIG. 1, so the detailed description is omitted here.

As above, the construction of the printing system of the second embodiment of the present invention has been described. But, in short, a great difference from the first embodiment is the point that the job information table 107 is provided not on the printer 150 side but on the host device side.

Next, operations of this printing system till the above print data is actually produced in the host 100, and transmitted to the printer 150, printing processing is executed based on it, and the printing processing is completed will be described.

Print data produced by the application 101 and printer driver 102 of the host 100 can be the same as that shown in FIG. 3 in the above first embodiment, so the description is omitted here.

When the JL data shown in FIG. 3 is received and the printer 150 completes printing the corresponding job, JL end-of-job notice data as shown in FIG. 12 is produced by the JL parser 152 of the printer 150.

FIG. 12 shows an example of JL end-of-job notice data that the JL parser 152 produces when a print job ends. As shown in the drawing, this JL end-of-job notice data has the structure in text format. <ESC> in the drawing indicates escape characters.

In FIG. 12, JOB-FINISHED on the line of (1) is a JL command indicating a notice of job end from the printer 150 to the host 100. In case of FIG. 12, it notifies that the job has ended and the paper output destination is that the paper output place (OUTPUT-PLACE) is BIN 1.

The line of (2) is continued from the line of (1), and indicates which job the contents of the answer of (1) concerns. That is, by this (1) and (2), it is notified that printing of the job by the job name of "jmori_1997_12_15_11_45_37" whose paper output place is BIN 1, that is, the first delivery bin is completed.

Such JL end-of-job notice data as above is produced by the JL parser 152 of the printer 150 when the printer 150 completed printing of a job, and transmitted to the host 100.

Hereinafter, the flow of processing of the whole print job in the construction of FIG. 11 will be described.

First, processing since a user issues a request for printing via a user interface of the application 101 of the host 100 and printing is performed on a medium such as a paper by the printer engine 155 till the notified paper output place medium is output is quiet the same as that shown in the above first embodiment, so the detailed description is omitted here.

Upon end of printing, when the printer engine 155 completes the output of all pages of the present job, it notifies the JL parser 152 of the printing-completed job name and paper output place with reference to current job information 160.

By this, the JL parser 152 produces the JL end-of-job notice data shown in FIG. 12 and stores it in the output buffer 156.

In response to this, the I/F driver 151 transmits the above JL end-of-job notice data stored in the output buffer 156 to the host 100.

When the above JL end-of-job notice data is transmitted from the I/F driver 151 of the printer 150 in this manner, the I/F driver 103 of the host 100 receives the transmitted JL end-of-job notice data and stores it in the input buffer 106.

By this, the host utility 104 interprets the JL end-of-job notice data stored in the input buffer 106. In this case, it interprets (1) and (2) of the JL end-of-job notice data of FIG. 12, and recognizes that it obtains the notice that the printing-completed job is one by the job name of "jmori_1997_12_15_11_45_37" and the paper output place of the output destination is BIN 1, that is, the first delivery bin.

On the basis of this, the utility 104 sets information of the printing-completed job in the job information table 107. For example, when the job information table 107 was FIG. 7 before this processing, it becomes as FIG. 8 after processing. That is, the job information table 107 on the host side can also be renewed by the same manner as the first embodiment.

As described above, in addition to that a print result that the user desired can be obtained, further, information of the bin to which the job in which printing and outputting have been completed has been output is stored in the job information table 107 of the host 100.

As above, the operations till the above print data is actually produced in the host 100, and transmitted to the printer 150, printing processing is executed based on it, the printing processing is completed, information of the printing-completed job is transmitted to the host 100, and information of the above job is registered in the job information table 107 of the host 100 on the basis of it have been described.

Next, operations when a user of the host 100 issues an inquiry to know where a specific job has been output will be described.

Here, when the user likes to know where the paper output place of this job is, he or she issues a request for an inquiry about the paper output place via the application 101 to the utility 104 via a proper user interface. At this time, for example, the user designates his or her object job by inputting such a job name as "jmori 1997_12_15_11_45_37" from a keyboard.

In response to this, the utility 104 recognizes with reference to the job information table 107 that the paper output place of the job by the name of "jmori 1997_12_15_11_45_37" is BIN 1, that is, the first delivery bin.

And, the utility 104 displays, e.g., such a message window as shown in FIG. 10 on a display (not shown), and thereby displays an answer to the user's inquiry.

The user interface of this inquiry can be optionally constructed. For example, when information of the user name and date is included as the job name as described above, the system in which the user name and job name are made to be input as retrieval keys and the paper output place of the aimed job is displayed is also thinkable. Also, when the printer is present on a plurality of networks, as the management of print jobs, as a matter of course, the IP address or the like is stored in the job information table 107. But, it can be also constructed such that retrieval can be performed from the address or the like of this printer. The retrieval key is not only made to be input from the user but also displayed in menu format and makes the user select by a device such as a mouse.

As described above, the operations that this printing system performs when the user issues a request that likes to know where the specific job has been output have been described.

Next, operations of this printing system when a user removes papers having been already output to a paper output place will be described. In this embodiment, because the job information table 107 is managed on the host side, in case that papers are removed from the paper output place, that effect is notified to the host side.

JL end-of-job notice data produced by the JL parser 152 when the printer 150 completes printing of the job and transmitted to the host 100 can be the same as FIG. 12.

On the other hand, in the printer engine 155 of FIG. 11, the paper output stack quantity detection sensor detecting whether or not papers are stacked on each paper output place is provided. This construction is quiet the same of FIG. 2 of the first embodiment, and when the user removes papers from each paper output place, it is notified to the engine controller 154 that the papers are removed.

For example, when papers of the first delivery bin (BIN 1) are removed, the engine controller 154 that received the notice that the papers have been removed notifies the JL parser 152 of the paper output place from which the papers have been removed.

And, the JL parser 152 produces such JL paper removal notice data as exemplified below, and stores it in the input buffer 156 to output to the host.

The JL paper removal notice data is constructed as, e.g., FIG. 13. FIG. 13 is a data list showing the structure of the JL paper removal notice data, produced from the JL parser 152, and has the structure in text format as shown in the drawing. <ESC> in the drawing indicates escape characters similarly to the example of the above-described each JL.

In FIG. 13, PAPER-REMOVED on the line of (1) is a JL command indicating the notice that papers have been removed from the paper output place from the printer 150 to the host 100. In this case, it indicates that papers have been removed from the paper output place that the paper output place (OUTPUT-PLACE) is BIN 1.

Such JL paper removal notice data as shown in this FIG. 13 is produced by the JL parser 152 when printer 150 is papers have been removed from the paper output place.

Here, when the paper output place from which papers have been removed is notified from the above engine controller 154, the JL parser 152 produces JL paper removal notice data shown in FIG. 13, and stores it in the output buffer 156.

Thereupon, the I/F driver 151 transmits the above JL paper removal notice data stored in the output buffer 156 to the host 100.

When the JL paper removal notice data as shown in FIG. 13 is transmitted from the I/F driver 151 of the printer 150 in this manner, the I/F driver 103 of the host 100 receives the corresponding JL paper removal notice data transmitted, and stores it in the input buffer 106.

In response to this, the utility 104 interprets the JL paper removal notice data stored in the input buffer 106.

In this case, it interprets (1) in FIG. 13 and recognizes that it obtains the notice that papers stacked on the paper output place is BIN 1, that is, the first delivery bin have been removed. On the basis of this, the utility 104 accesses the job information table 107, and eliminates all information of jobs that the paper output place is BIN 1.

Figure 9:
FIG. 9 is an explanation view showing an example of the contents of a job information table.

If the job information table 107 was FIG. 8, the notice that papers have been removed from the first delivery bin (BIN 1) is performed, and when the utility 104 eliminates all that the paper output place is BIN 1 from the job information table 107, the job information table 107 becomes as FIG. 9.

As described above, when the user removes papers having been already output to the paper output place, job information having the paper output place as the output destination is eliminated from the job information table 107 of the host 100.

As described above, in this embodiment, as for each print job, by operating such that, during the term since papers have been printed till the papers are removed, it is stored in the job information table of the host which paper output place each print job has been output to, and when an inquiry is received from the user, paper output place information of the designated job is given with reference to the above job information table, the user can know which paper output place the job that he or she output has been output to.

Also, when papers are removed, the printer notifies the host of the paper output place from which the papers have been removed, and the host receives the notice and operates so as to eliminate information on the job output to the removed paper output place from the job information table. Accordingly, the job information table can be constructed by the required minimum memory.

Also in this embodiment, the connection form is optional in accordance with the construction of the communication medium 190. For example, it is needless to say that a similar construction can be implemented even if the printer 150 can be connected from a plurality of hosts via a network.

Also, in this embodiment, print data and control data can be transmitted to and received from separate channels, respectively, by using a plurality of channels in the communication medium. By such a construction, realtime performance is improved and use convenience becomes better.

Third Embodiment

In the first and second embodiments, examples in which the host and printer are connected in one-to-one are shown. However, as mentioned before, these host and printer can be connected by a network. In this embodiment, such a construction will be concretely shown. Besides, hereinafter, as for parts overlapping with the first and second embodiments, the detailed description will be omitted.

Figure 14:
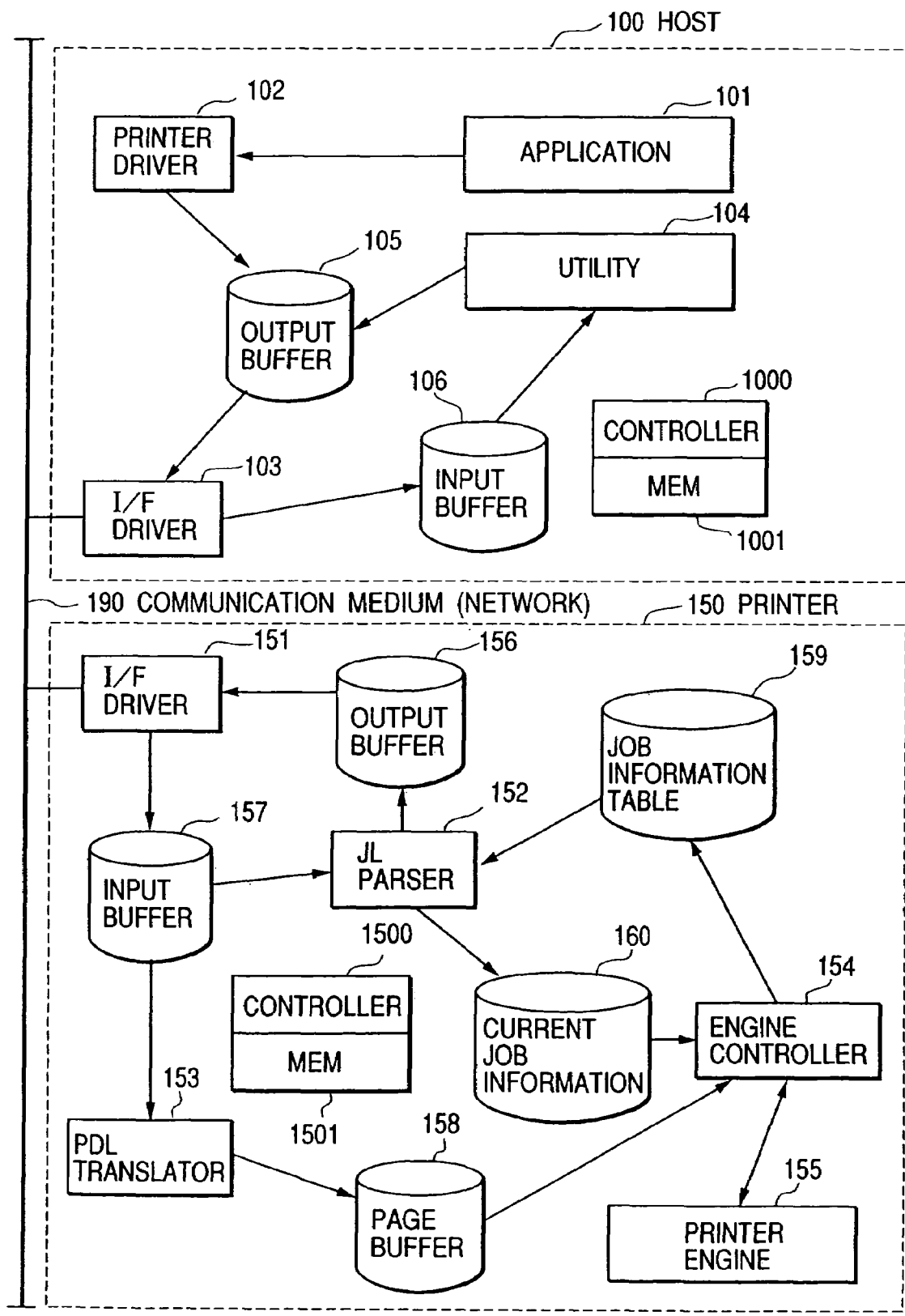
FIG. 14 is a block diagram explaining the construction of a printing system in the third embodiment of the present invention.

FIG. 14 is a block diagram showing the construction of a printing system in the third embodiment of the present invention. The same parts as those of FIG. 1 are denoted by the same references. The printing system of the present invention has the construction in which a host 100 and a printer 150 are connected via a communication medium 190, similarly to FIG. 1.

In FIG. 14, the communication medium 190 is network media such as Ethernet or FDDI. The I/F driver 103 is constructed along the specification of the corresponding network media in order to be able to perform input/output with such network media, and makes communication in two ways with the printer 150 via the communication medium 190 on print data and control data. At that time, it transmits data stored in the output buffer 105 to the printer 150. Further, it receives data transmitted from the printer 150, and stores it in the input buffer 106.

The other construction of the host 100 is substantially the same as FIG. 1. The host 100 comprises an application 101, a printer driver 102, an I/F (interface) driver 103, a utility 104, an output buffer 105, an input buffer 106, and a printer list 108. Of course, the host 100 comprises also a not-shown keyboard, a not-shown mouse, a not-shown display, etc. for operations of the application 101, utility 104, etc.

The functions of the construction members of the host 100 are substantially the same as FIG. 1. Hereinafter, these construction members will be briefly shown.

First, the application 101 provides a graphic user interface to a user, and produces image data suitable for the user's purpose.

The printer driver 102 converts image data produced by the application 101 into data in page description language (hereinafter PDL) printable in the printer 150.

The utility 104 provides a graphic user interface to a user. Via the graphic user interface, it gives information obtained from the printer 150 to the user, or changes the setting of the environment of the printer 150 in accordance with the user's demand.

The output buffer 105 is for temporarily storing print data produced by the printer driver 102, and control data such as an inquiry in job language (the above-described JL) produced by the utility 104.

The input buffer 106 is for temporarily storing data received by the I/F driver 103 from the printer 150.

A controller 1000 and a memory 1001 are the same as FIG. 1, so the detailed description is omitted here.

On the other hand, the printer 150 comprises an I/F driver 151 constructed so as to be capable of communicating with the communication medium 190 consisting of such network media as described above, a JL parser 152, a PDL translator 153, an engine controller 154, a printer engine 155, an output buffer 156, an input buffer 157, a page buffer 158, a job information table 159, and current job information 160.

Although the functions of these construction members of the printer 150 are equivalent to those of the above-described FIG. 1, they will be briefly shown hereinafter.

First, the I/F driver 151 is constructed along the specification of the communication medium 190 consisting of such network media as described above, and makes communication with the host 100 on print data and control data. That is, it receives print data and control data transmitted from the host 100, and transmits data stored in the output buffer 156 to the host 100.

The JL parser 152 interprets received data and executes processing in relation to the command of JL.

The PDL translator 153 interprets the portion of PDL data among print data and converts it into image data. The image data converted here is stored in the page buffer 158.

The input buffer 157 temporarily stores all data received by the I/F driver 151 and functions as a buffer for the succeeding processing.

The output buffer 156 is for temporarily storing data produced by the JL parser 152.

The engine controller 154 delivers image data stored in the page buffer 158 to the printer engine 155 with monitoring the operation timing of the printer engine 155. Also, it is in charge of paper output control designating a paper output place to the printer engine 155 with reference to current job information 160.

The printer engine 155 is for receiving image data from the engine controller 154, and performing printing on a medium such as a paper by a known printing method, whose construction can be the same as FIG. 2. Accordingly, the detailed description of the construction of the printer engine 155 is omitted. Besides, the printer engine 155 outputs papers to the paper output place designated from the engine controller 154 upon printer output.

In current job information, job information on the job that the printer engine 155 is printing is temporarily stored.

In the job information table 159, a plurality of pieces of information on the jobs that the printer 150 had already printed is stored.

Packaging of a controller 1500 and a memory 1501 is the same as FIG. 1, so the detailed description is omitted here.

The printing system of this embodiment is constructed as described above. An outline of the operations of this printing system till the above print data is actually produced in the host 100, and transmitted to the printer 150, printing processing is executed based on it, and the printing processing is completed is the same as the first embodiment.

Figure 16:
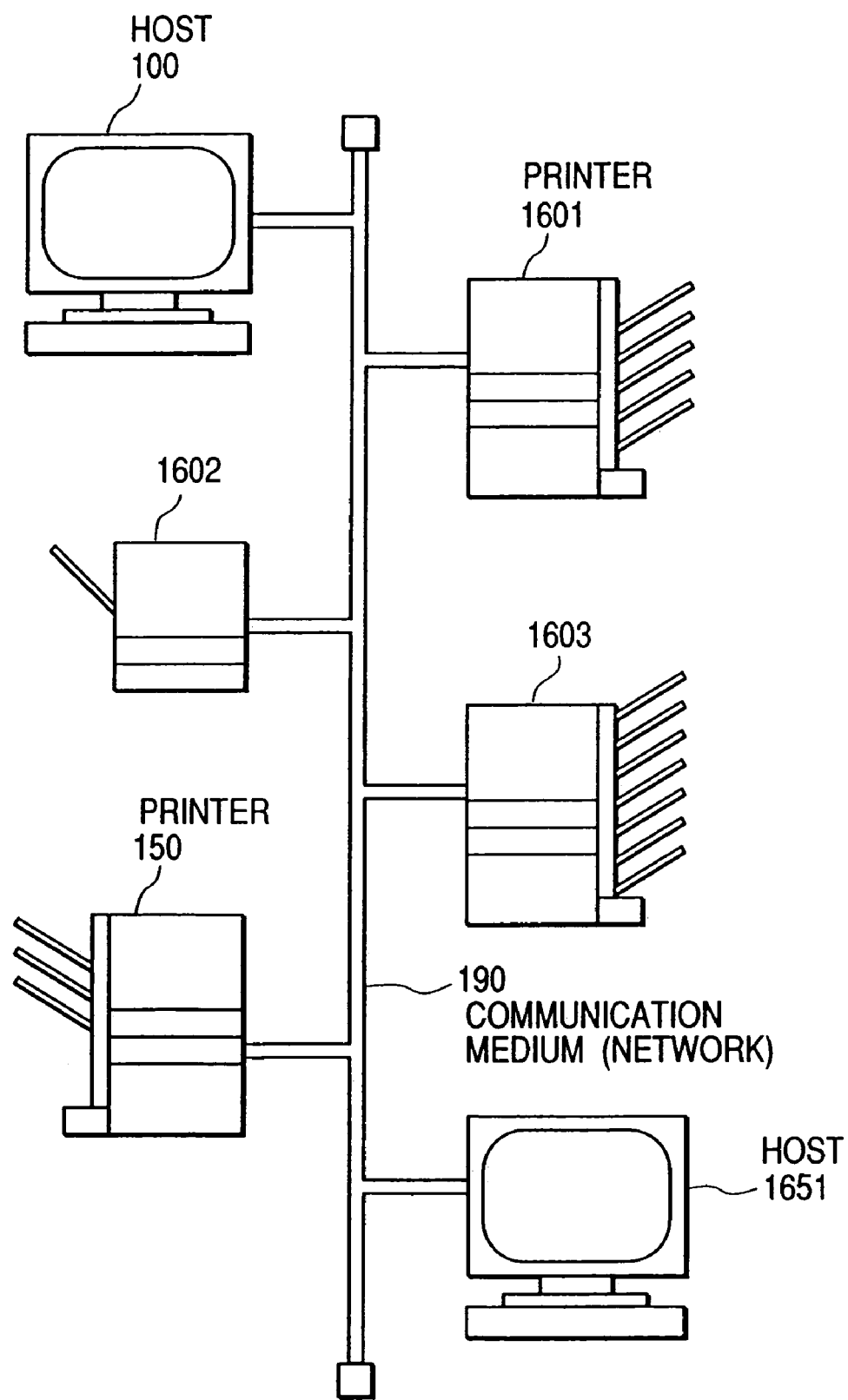
FIG. 16 is a block diagram showing the construction of the whole printing system connected via a network.

The host 100 and the printer 150 of FIG. 14 are not connected in one-to-one. For example, as shown in FIG. 16, other than the host 100 and the printer 150, a plurality of host 1651, printer 1601, printer 1602 and printer 1603 can be connected via the communication medium 190 (network). Here, assume that the printers 1601 to 1603 are constructed similarly to the printer 150 and constructed such that they can receive a job via the network and print it (however, the number of paper output places or the construction or scale of particulars of the printing mechanism can be different).

In such a construction, a print job can be issued from the host 100 to the printers 1601 to 1603, and printing can be executed. Particularly in such a construction, as described in the prior art, it is fully possible that a user can not find where his or her output result has been output.

In this embodiment, the user can know where the output of a specific job has been output. Hereinafter, operations of this printing system when a user issues a request for knowing the paper output destination of a specific job will be described with reference to FIG. 14 and the above FIG. 16.

Here, first, when the user likes to know which paper output place of which printing device of which printer a job has been output to, he or she designates the job to the utility 104 via a user graphic interface and issues a request for an inquiry about the printer and paper output place.

At this time, in the method that the user specifies the aimed job, in case that information of the user name and date is included as the job name as mentioned before in the second embodiment, the user name and the job name are made to be input as retrieval keys to designate the aimed job, or the retrieval is made possible from IP address of the printer that executed the print job, or the like. The retrieval key not only is input from the user, but also can be displayed in menu format and selected by the user with a device such as a mouse.

When the aimed print job is designated in this manner, the utility 104 of the host 100 produces JL inquiry data as shown in FIG. 4 of the first embodiment on the basis of the user's job designation, and transmits it to the printer to makes inquiries.

But, at this time, since a plurality of printers is present in the whole of the system, the utility 104 transmits the JL inquiry data as FIG. 4 to all printers on the network in order.

For example, it provides a printer list as shown in FIG. 17 in a memory managed by the application 101 and utility 104 of the host 100, and transmits the JL inquiry data as FIG. 4 with reference to this printer list to the printers on the network in order, and makes inquiries. Besides, in the example of printer list of FIG. 17, as for all printers present on the network, the addresses (here IP addresses) and the name character sequences are listed. Such data of the addresses and names of the printers can be previously registered by a predetermined operation, or automatically made by making communication with the printers presently connected on the network using protocol such as SNMP or SMB.

Now, the printer having received the JL inquiry data as FIG. 4 from the host 100 retrieves on the job information table, and judges whether or not information of job of the designated job name is present. If present, it produces JL answer data as shown in FIG. 5 of the first embodiment and returns it to the host that issued the inquiry request. If the job corresponding to the inquiry is not present, it produces JL answer data that the job is not present, and transfers it to the host.

Here, in FIG. 18, an example of JL answer data that the designated job information is not present is shown.

In FIG. 18, ANSWER on the line of (1) is a JL command indicating an answer from the printer to the host in response to INFO of (2) of FIG. 4. In this case, answering that the paper output place (OUTPUT-PLACE) is UNKNOWN, that is, unknown (not present) is indicated.

Also, the line of (2) is continued from the line of (1), and indicates which job the contents of the answer of (1) concerns. That is, by this (1) and (2), it is answered that the job by the job name of "jmori 1997_12_15_11_45_37" is not present in this printer. In case of receiving such JL answer data, the utility 104 of the host 100 judges that the desired job has not been output to this printer.

And, when the utility 104 receives JL answer data as FIG. 18, it interprets this content and can recognize which output place of which printer the job has been output to.

Besides, if the corresponding job is present in the printer having received the inquiry, this printer transmits JL answer data in the format as shown in FIG. 5.

Accordingly, here, in case of requesting from a user the printer and paper output place to which the job called "jmori 1997_12_15_11_45_37" has been output, when JL inquiry data is transmitted to the printer 150. If the corresponding job is present, JL answer data as shown in FIG. 5 is transmitted from the printer 150. The utility 104 of the host 100 can indicate an answer to the user's inquiry by displaying on a display (not shown) of the host 100 on the basis of this, or the like.

Figure 15:
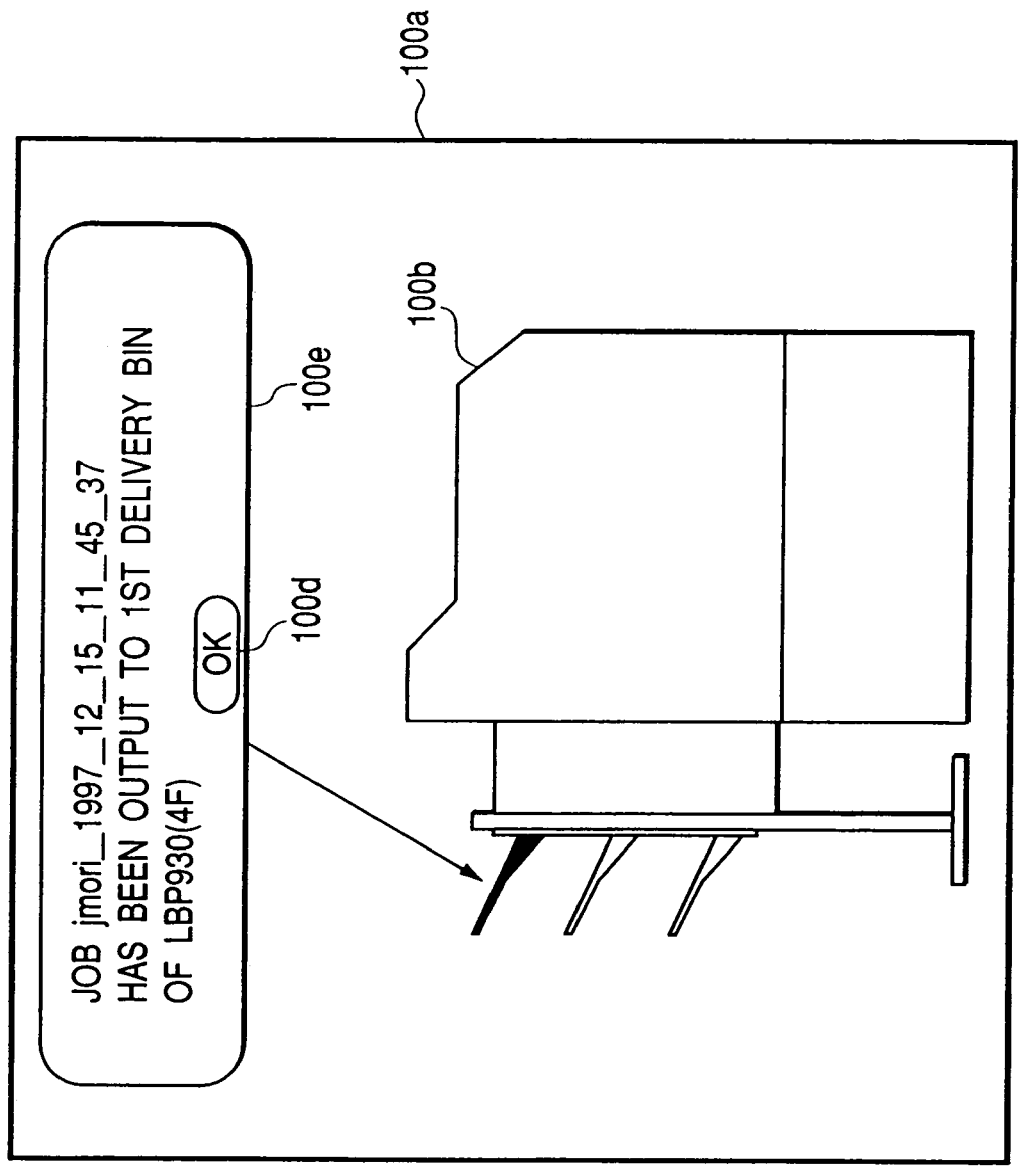
FIG. 15 is an explanation view showing an example of a display performed on the host after an inquiry about paper output destination in the third embodiment.

In this display processing, for example, it is thinkable to display such a message window as shown in FIG. 15 with reference to the printer list of FIG. 17. FIG. 15 shows an example of a dialogue picture 100a by substantially the same GUI as FIG. 10 shows an example of a picture 100a. Here, a window (dialogue) 100e indicating with characters the paper output destination of the inquired job on the image (or icon) 100b symbolically indicating the printer. Of course, in this embodiment, since the printer of the paper output destination is not specific one, the name (LBP930(4F)) of the printer that executed the print job and the name of the bin of the paper output destination that paper output has been performed by the corresponding job in the printer are displayed together with the job name in the dialogue 100e of FIG. 15.

The window (dialogue) 100e of FIG. 15 disappears by selecting the button 100d of "OK" displayed therein by a mouse or the like. Similarly to the above description, the above display processing may be controlled at a lower level than the utility 104.

As above, when a user issues a request for knowing where a specific job has been output, JL inquiry data is transmitted to each printer on the network. Because such an answer as shown in FIG. 5 is returned from the printer that treated with the corresponding job and such an answer as shown in FIG. 18 is returned from the printer that did not treat with the corresponding job, the host can inform the user which paper output place of which printer the aimed job has been output, by displaying this.

As another embodiment, in the second embodiment, if the job information table (FIG. 7) is provided in each printer or the printer in which an item of output data is added is displayed, displaying as shown in FIG. 15 can be performed when a plurality of printers is connected even in case of the second embodiment.

Besides, processing of this printing system when a user removes papers having been already output to a paper output place can be executed in quiet the same manner as the first embodiment since the job information table 159 is provided on the printer 150 side. In case that a large number of printers are present on a network like this embodiment, the construction that the job information table 159 is provided on the printer 150 side is convenient because job information of a plurality of printers need not be managed on the host side.

As described above, according to this embodiment, as for print jobs, during the term since papers have been printed till the papers are removed, it is stored in the job information table of the printer which paper output place each print job has been output to. When an inquiry is received from the host, the paper output place of the designated job is answered with reference to the above job information table. Further, the host informs the user of the paper output place of the above job obtained from the printer, thereby letting the user know which paper output place the job that he or she output has been output to.

Also, in this embodiment, when papers output similarly to the first embodiment are removed, information on (all) jobs that performed output to the corresponding paper output place is eliminated from the job information table. Accordingly, the job information table can be constructed by the required minimum memory.

Also in this embodiment, between the host and printer, print data and control data can be transmitted to and received from separate channels, respectively, by using a plurality of channels in the communication medium. In this case, real-time performance is improved and use convenience becomes better.

Also, as the network as the communication medium 190, other than Ethernet and FDDI exemplified above, it is needless to say that a similar construction can be implemented in the construction in which a plurality of printers is connected to one host, e.g., using a bus such as SCSI, USB or IEEE 1394, or the like.

Also, in this embodiment, when a user makes an inquiry about the output destination of a job, the system operates to make inquiries to all printers on the network. However, it is also possible that a job output printer information region is provided on the host to store in it which printer a print data has been transmitted to, and when a user inquiries about the output destination of a job, after the printer is specified with reference to the job output printer region, to make an inquiry to the printer.

As above, three embodiments have been shown, but each optional part in the above constructions can be used by being adopted and rejected and combined within the scope not deviating the scope of the present invention. Roughly classifying, there are the construction in which job information is managed in the printer as the first and third embodiments, and the construction in which job information is managed in the host device as the second embodiment. But, in practice, the detail of processing that is performed in the printer or host device in the above embodiments can be performed in any device. For example, the construction in which job information is stored in a memory of the printer but eliminating the job information is executed by the control by main conduct of the host device that received a notice of removal of papers from the paper output place from the printer, or the like is thinkable.

Also, the printing control program in each embodiment is respectively stored in the memory 1001 or 1501 of each device as the program of the printer or host device. But the present invention is not limited to the system in which the program of each device is fixedly stored in this manner. For example, the control program of the printer is not necessarily stored in the memory of the printer. It can also be downloaded to the printer from the host on the basis of a predetermined protocol and executed. Also, if the programs of the host and printer in relation to the present invention are described in a language independent from the hardware, the control of the present invention can be implemented even in the construction in which the program executed in the host to a point of time is transferred to the printer to execute the remaining part.

As described above, in a printing system in which a host device and a printer are connected via a communication medium and a print job produced in said host device is transferred to said printer to execute printing, a method for controlling the system, and a computer readable recording medium storing a control program for the system, the construction is employed that paper output place information on the paper output place used in said print job is registered in memory means when the print job is completed, paper output place information on a designated print job is retrieved from said memory means in accordance with a request from said host device, and the paper output place information on the designated print job obtained by said retrieval is informed to a user of said host device. Accordingly, there is the superior effect that the user of the host device can clearly know which paper output place of which printer the printed result that he or she is to output (or has output) is to be output (has been output) to.

Also, in the present invention, since the construction is employed that the paper output place information of the print job having used the corresponding paper output place is eliminated from said memory means when papers are removed from the paper output place of said printer, there is the superior effect that the memory means can be renewed in accordance with the removal of the papers from the paper output place, the memory resources are not wasted wastefully, information on paper output destination of a job is managed suitably, a host device or a user of it can be notified in case of need, the information on paper output destination on a job or information on the whole of jobs can be suitably eliminated when it becomes useless, and thereby a realistic job management can be performed.

Also, in the present invention, the construction can be employed that said registration or said retrieval is executed in said printer, or said registration or said retrieval is executed in said host device, and there is the superior effect that the management of jobs including paper output place information suitable for the construction of the whole of the system can be implemented.

What is claimed is:

1. A method for performing a print process by a system which includes at least one of a plurality of printers including a printer having at least a sheet storage unit, a print unit and a data storage unit capable of storing a plurality of print job data, said method comprising:
    a job specifying step, of inputting, via a user interface unit, first information for specifying a job;
    a request step, of issuing request data for requesting information relative to the specific job specified by the first information; and
    a notifying control step, of causing the user interface unit to notify second information including information for enabling a user to confirm which of the plurality of printers is used for the specific job, when the request data is issued in said request step in the case where the plurality of printers is present in the system.

2. A method according to claim 1, wherein said notifying control step includes causing the user interface unit to display visual data of the printer used for the specific job.

3. A method according to claim 1, wherein said notifying control step includes causing the user interface unit to display printer name data representing a name of the printer used for the specific job, from among the plural printer name data representing names of the plural printers.

4. A method according to claim 1, wherein said notifying control step includes causing the user interface unit to display job name data of the specific job.

5. A method according to claim 1, wherein said notifying control step includes causing the user interface unit to notify the second information including the information for enabling the user to confirm which sheet storage unit of which of the plural printers is used for the specific job.

6. A method according to claim 5, wherein
    the printer can print a print job output from a computer,
    said job specifying step includes enabling to input the first information through a user interface unit of the computer, and
    said notifying control step includes causing the user interface unit of the computer to notify the second information.

7. A method according to claim 6, wherein the computer can be connected to the plural printers through a network.

8. A method according to claim 1, wherein the job includes enabling to input, via the user interface unit, the first information which includes at least any one of information concerning a user name, information concerning a job name, and information concerning an IP address.

9. A system which includes at least one of a plurality of printers including a printer having at least a sheet storage unit, a print unit and a data storage unit capable of storing a plurality of print job data, said system comprising:
    a receiver unit, adapted to receive a request data for requesting information relative to a specific job specified by first information, input via a user interface unit, for specifying a job; and
    a notifying control unit, adapted to cause said user interface unit to notify second information including information for enabling a user to confirm which of the plurality of printers is used for the specific job, when the request data is received by said receiver unit in the case where said plurality of printers is present in said system.

10. A computer-readable memory medium which stores a control program for a system which includes at least one of a plurality of printers including a printer having at least a sheet storage unit, a print unit and a data storage unit capable of storing a plurality of print job data, said program comprising:

code for a job specifying step, of inputting, via a user interface unit, first information for specifying a job;

code for a request step, of issuing request data for requesting information relative to the specific job specified by the first information; and code for a notifying control step, of causing the user interface unit to notify second information including information for enabling a user to confirm which of the plurality of printers is used for the specific job, when the request data is issued in said request step in the case where the plurality of printers is present in the system.

* * * * *